UNITED STATES PATENT OFFICE.

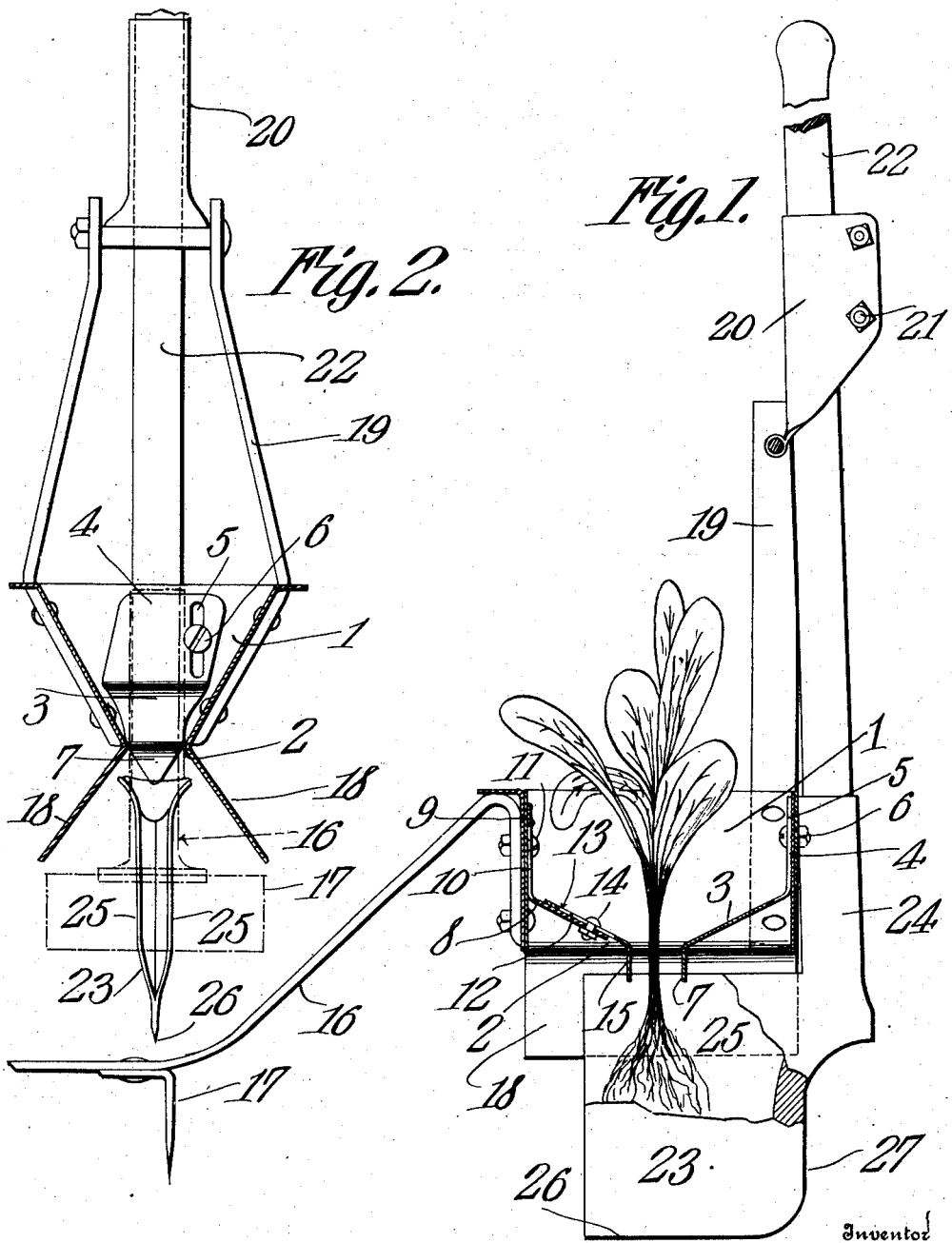

ALBERT C. HERTZFELDT, OF INDEPENDENCE, WISCONSIN.

HAND-PLANTER.

No. 905,700.          Specification of Letters Patent.          Patented Dec. 1, 1908.

Application filed August 12, 1908. Serial No. 448,179.

*To all whom it may concern:*

Be it known that I, ALBERT C. HERTZFELDT, a citizen of the United States, residing at Independence, in the county of Trempealeau and State of Wisconsin, have invented a new and useful Hand-Planter, of which the following is a specification.

This invention has relation to hand planters, and it consists in the novel arrangement and construction of its parts, hereinafter shown and described.

The object of the invention is to provide a simple and an effective hand mechanism for planting sprouted roots in the soil, and with this object in view the planter consists primarily of a hopper provided in its bottom with adjustable valves, the space between the edges of which form an outlet for the said hopper. The hopper is further provided at its lower edges with inclined sections which are adapted to tamp the soil about the roots of the plants when the same are set in the ground. The object in providing the adjustable valves in the bottom of the hopper is to afford means whereby sufficient space may be provided for roots of large or small size. An arm is connected with the said hopper and is provided with an anchor plate or blade which is adapted to enter the soil. A handle or staff is pivotally and adjustably connected with the said hopper and is provided at its lower end with a cleaver which is adapted to open an incision in the soil below the hopper, and the incision thus made is adapted to receive the roots of the plant or plants.

In the drawings:—Figure 1 is a longitudinal sectional view of the planter, and Fig. 2 is a transverse sectional view of the same.

The planter consists of the hopper 1, which is provided in its bottom with an opening 2; the valve 3, is located in the forward end portion of the said hopper 1, and the major portion of the said valve is downwardly inclined. The valve 3 is provided at its upper end with a section 4, which in turn is provided with an elongated slot 5, adapted to receive the bolt 6 which passes transversely through the said slot and through the forward side of the hopper 1. By means of the said bolt and slot connection between the valve and forward side of the said hopper it is apparent that the valve may be adjusted vertically within the hopper. The valve 3 is provided at its lower end with the downwardly extending lip 7. The plate 8 is also located in the lower portion of the hopper 1, and the said plate 8 is provided with the upwardly extending section 9, having an elongated slot 10. The bolt 11 passes transversely through the slot 10 and the rear side of the hopper 1. It is obvious that by means of the bolt slot connection between the plate 8 and the said hopper that the plate may be adjusted vertically within the hopper. The valve 12 is mounted upon the lower portion of the plate 8 and is provided with an elongated slot 13. The bolt 14 passes transversely through the slot 13 of the valve 12 and the said plate 8. The valve 12 is provided at its lower portion with a downwardly extending lip 15, which lies in a plane parallel with that occupied by the lip 7. By the arrangement above described it is obvious that by loosening the bolt 14 the valve 12 may be moved towards or away from the valve 3 as desired, and thus the space between the lips of the said valves may be increased or diminished as desired for the reception of roots of different sizes.

The arm 16 is attached to the rear side of the hopper 1 and is downwardly disposed at its rear end portion. The anchor plate 17 is attached to the under side of the rear end portion of the said arm 16 and is adapted to be pushed into the soil by the foot of an operator. The hopper 1 is provided at the lower portions of its lateral sides with the inclined sections 18. The arms 19 are attached to the sides of the forward portion of the hopper 1, and at their upper end portions converge slightly toward each other. The sleeve 20 is pivotally mounted between the upper extremities of the arms 19 and is provided with a clamping bolt 21. The handle or staff 22 passes through the sleeve 20 and may be secured in an adjusted position therein by first loosening the bolt 21 and then slipping the said handle longitudinally within the sleeve and then tightening the said bolt 21. The cleaver 23 is mounted upon the lower end of the handle 22. The said cleaver is provided with a socket 24, which receives the lower extremity of the said handle and the side portions of the said cleaver are made up of the spaced plates 25 which merge together at their lower portions and form a common cleaving edge 26. The forward portions of the plates 25 also merge together and form an edge 27.

The operation of the planter is as follows:—
When the implement is first applied to the soil the handle 22 is substantially vertically disposed with relation to the hopper 1, and when in this position the operator places his foot upon the rear end portion of the arm 16 and forces the anchor plate 17 into the soil and at the same time forces the cleaver 23 down into the soil. The roots of a plant have been previously passed down through the hopper 1 and the said roots enter the space between the plates 25 of the cleaver 23. The handle 22 is then swung upon the pivotal connection between the sleeve 20 and the arms 19, so that the cleaver 23 is swung laterally to the surface of the soil. This leaves the roots of the plant deposited in the cleft cut by the said cleaver. At this stage in the process of planting the operator further depresses the arm 16, and the inclined sections 8 in at the sides of the hopper 1 are forced into the soil and press the same laterally about the roots of the plant which is previously deposited in the soil as described. After this is done the implement is lifted bodily from the ground and the plant is left standing in the soil, as there is sufficient space between the lips of the valve to permit the stalk and foliage of the plant to pass through. By reason of the fact that the lips of the said valve are in parallel relation to each other broad surfaces will be presented to the sides of the stalks of the plant, and, consequently, there is no danger of the plant being moved laterally when the cleaver 23 is swung up to such an extent as to injure the same by being brought in contact with the sharp, or relatively sharp edges.

Having described my invention, what I claim as new, and desire to secure by Letters Patent, is:—

1. A planter comprising a hopper having an opening in its bottom and a cleaver pivotally mounted to swing below the opening in the hopper and also from under the same, said cleaver being formed from plates spaced apart and which merge together at their edges.

2. A planter comprising a hopper having an opening in its bottom, a cleaver pivotally mounted and adapted to swing under the opening in the bottom of the hopper and away from the same, and means for varying the arc in which the said cleaver swings.

3. A planter comprising a hopper having an opening in its bottom, a sleeve pivotally mounted upon the hopper, a staff adjustably mounted in said sleeve and a cleaver mounted upon the said staff and adapted to swing under the opening in the bottom of the hopper.

4. A planter comprising a hopper having an opening in its bottom and being provided at its sides with inclined sections and a cleaver pivotally mounted with relation to the hopper and adapted to swing under the opening in the bottom thereof.

5. A planter comprising a hopper having an opening in its bottom, a cleaver pivotally mounted with relation to the hopper and adapted to swing under the opening in the bottom thereof, and an adjustable valve located in the bottom of the hopper for increasing or decreasing the area of the opening therein.

6. A planter comprising a hopper, a cleaver pivotally mounted with relation to the hopper and adapted to swing under the same, adjustable valves mounted in the lower portion of the hopper and having depending lips and adapted to be moved to increase or diminish the area of the opening in the bottom of the hopper.

7. A planter comprising a hopper having an opening in its bottom, means for increasing or decreasing the area of the said opening, an anchor plate connected with the hopper, earth depressors attached to the hopper and a cleaver pivotally mounted and adapted to swing under the opening in the bottom of the hopper.

In testimony that I claim the foregoing as my own, I have hereto affixed my signature in the presence of two witnesses.

ALBERT C. HERTZFELDT.

Witnesses:
WALTER E. SPRECHER,
OTTO A. SPRECHER.